United States Patent

[11] 3,615,799

[72] Inventors Charles R. Gannon
Ashland, Ky.;
William H. Gilkerson, Huntington, W. Va.
[21] Appl. No. 700,732
[22] Filed Jan. 26, 1968
[45] Patented Oct. 26, 1971
[73] Assignee Ashland Oil, Inc.
Houston, Tex.

[54] METHOD OF PREPARING SPRAYABLE BITUMINOUS COMPOSITION
4 Claims, No Drawings
[52] U.S. Cl. .................................................. 106/278,
106/279, 208/22, 208/23, 208/44
[51] Int. Cl. .................................................. C08h 13/00,
C08h 17/22, C08j 1/46
[50] Field of Search .......................................... 106/273–285,
311; 208/22, 23, 44, 45, ; 252/364;
260/28.5

[56] References Cited
UNITED STATES PATENTS
| | | | |
|---|---|---|---|
| 2,159,854 | 5/1939 | Jourdan et al. | 106/278 X |
| 2,270,047 | 1/1942 | Goodwin et al. | 106/278 X |
| 3,287,146 | 11/1966 | Rogers et al. | 106/278 X |
| 2,870,080 | 1/1959 | Illman et al. | 106/278 X |

OTHER REFERENCES
Abraham, Asphalts and Allied Substances, 6th Ed., Vol. Three, N.Y., D. Van Nostrand Company Inc., 1960, TN 853
A35 1960 C3, Pages 373 and 702, footnote 193 relied on.

*Primary Examiner*—Julius Frome
*Assistant Examiner*—Joan B. Evans
*Attorney*—Walter H. Schneider ABSTRACT: A bituminous composition, capable of being sprayed at ambient conditions and particularly useful as a soil stabilizer, including, a major proportion of a highly aromatic, bituminous material, such as thermally cracked pitch, in an amount between about 35 percent and 75 percent, a predominantly paraffinic solvent, such as kerosene, in an amount between about 15 percent and 35 percent, a predominantly naphthenic solvent, such as naphtha, in an amount between about 5 percent and 20 percent, and methylene chloride, in an amount between about 5 percent and 20 percent; and the method of preparing this composition, including, heating the bituminous material to a temperature above its melting point and pumping the same into a blending tank equipped with cooling coils and an impeller-type mixer, immediately adding the paraffinic solvent to the bituminous material at a slow rate while agitating and cooling, thereafter adding the naphthenic solvent to the mixture when the temperature of the mixture reaches a point above 25° F. below the boiling point of the naphthenic solvent, agitating and cooling the mixture until the mixture reaches a temperature between about 100 and 105° F., and slowly adding the methylene chloride, while continuing cooling to essentially ambient temperature over an extended period of time, such as 30 minutes.

METHOD OF PREPARING SPRAYABLE BITUMINOUS COMPOSITION

FIELD OF THE INVENTION

The present invention relates to a bituminous composition, adapted to be sprayed at ambient temperature, and a method of making the same. In a more specific aspect, the present invention relates to a cutback, highly aromatic, bituminous composition and the method of making the same.

SUMMARY OF THE PRIOR ART

It has heretofore been conventional practice to use a wide variety of natural and pyrogenous, bituminous materials as coating compositions, as road-building materials and as soil stabilizers. The origin, composition and properties of such materials vary quite widely, and particularly as to their solubility in various solvents or carriers. For example, some of these bituminous materials are partially soluble in light petroleum distillates, such as gasoline, kerosene and naphtha, while others are essentially insoluble in these materials. A more universal solvent for a wider variety of bituminous materials is benzene, or benzene in combination with its homologs and derivatives. However, even benzene and its homologs and derivatives have heretofore been known to require cosolvents to increase the solubility of various bituminous materials therein. It has also been proposed in the prior art to utilize various special blends of benzene, benzene derivatives and benzene homologs to increase the solubility of bituminous materials therein and the fluidity of resultant composition. Perhaps the most effective solvent for bituminous materials is carbon disulfide. However, some bituminous materials are not soluble in carbon disulfide. For example, natural pyrobitumin is relatively insoluble in carbon disulfide. As indicated, even the most effective and most widely applicable solvents for bituminous materials are not completely soluble or miscible with the bituminous material and must be modified in order to increase their effectiveness. In addition, the most universally applicable and effective of the known solvents are relatively expensive and cannot be used for many of the more commercially desirable end uses of bituminous materials.

Particularly difficult bituminous materials, from the standpoint of solubility in relatively inexpensive solvents, are pyrogenous asphalts, such as residues of thermal cracking of petroleum, coal tar pitches, and the like. These materials are highly aromatic in nature and therefore difficulty soluble in most solvents. For example, these highly aromatic pitches are relatively insoluble in paraffinic and naphthenic solvents. It has been found that thermally cracked pitch is 40 percent to 60 percent insoluble in kerosene and 60-70 percent insoluble in naptha, as determined by ASTM Procedure D-2317-64T. It has also been found that because of this limited solubility, compositions of such highly aromatic pitches in paraffinic and naphthenic solvents, alone or in combination, separate in a few hours and therefore have extremely poor storage stability.

One of the greatest needs for bituminous compositions, particularly those which can be stored, handled and sprayed at ambient temperature, is in the field of soil stabilizers, for example, as dust palliatives, for the treatment of shoulder and overrun areas adjacent airstrips, as dust palliatives and surfacing materials for temporary air fields and light traffic areas, as soil binders, for example as a primer for the base course of a road, as binders for gravel and dirt roads in rural areas, as surface treatments for the shoulders of existing highways, as erosion preventing materials for shoulders, slopes, etc., and as a binder for aggregate used in patching existing road surfaces. In order to serve these purposes, a good soil stabilizer must have certain characteristic properties. First of all, it should be pumpable or sprayable under ambient conditions, thereby eliminating the necessity of heating equipment at the site of use. The material should also be stable in storage and transport for extended periods of time, thereby permitting shipment and storage and eliminating the necessity of complex mixing and blending equipment at the point of use. The material should also set or cure in a relatively short period of time, for example in about four hours. It should also have a life span, when subjected to the elements, in excess of about 6 months. It is also desirable that the material be nontoxic, noncorrosive, and harmless to crops and the like.

Historically, dust palliatives have been made by cutting back vacuum reduced asphalts, cracked asphalts, natural asphalts, solvent-precipitated asphalts and other materials with a variety of petroleum fractions, such as gas oils, and in some instances, lighter petroleum fractions, such as kerosene and naphtha. Emulsions with water and inverted cutbacks utilizing water, have also been produced in the past. All of these materials have the inherent disadvantage of curing very slowly. Secondly, these materials generally possess very little strength when combined with the soil. Finally, in many cases, the viscosity of the material is such that the material must be heated at the point of use before application.

SUMMARY OF THE INVENTION

It is therefore an object of the present invention to provide an improved bituminous composition and the method of preparing the same which essentially overcomes all of the previously mentioned disadvantages of the prior art. Another object of the present invention is to provide an improved bituminous composition and method of preparing the same which can be sprayed at ambient temperatures. Another and further object of the present invention is to provide a bituminous composition and method of preparing the same which can be transported and stored for extended periods of time without loss of homogeneity. A further object of the present invention is to provide a bituminous composition and method of preparing the same which cures in a relatively short period of time. Still another object of the present invention is to provide a bituminous composition and method of preparing the same which has excellent strength characteristics when combined with soil. Another object of the present invention is to provide a bituminous composition and method of preparing the same which can be safely handled with a minimum of equipment. Yet another object of the present invention is to provide a bituminous composition and method of preparing the same which penetrates rapidly into clay, sand and silt. Another and further object of the present invention is to provide a bituminous composition and method of preparing the same which has "self-healing" characteristics. These and other objects and advantages of the present invention will be apparent from the following description.

Briefly, in accordance with the present invention, a bituminous composition, highly useful as a soil stabilizer, comprises a major proportion of a highly aromatic bituminous material, and a minor proportion of a solvent system, including, a predominantly paraffinic solvent, a predominantly naphthenic solvent and methylene chloride. This composition is prepared by heating the bituminous material to a temperature above its melting point, adding the paraffinic solvent, while cooling and stirring the bituminous material, adding the naphthenic solvent while continuing to cool and stir the mixture, and finally adding the methylene chloride, while cooling the mixture to ambient temperature.

DESCRIPTION OF THE PREFERRED EMBODIMENTS

The highly aromatic, bituminous material useful in accordance with the present invention includes any highly aromatic material, such as thermal cracking pitches, produced as a result of the thermal cracking of petroleum fractions, pitch residues, resulting from the distillation liquid products of normally solid carbonaceous materials, such as coal tars, etc.

A suitable predominantly paraffinic hydrocarbon solvent may also be derived from a variety of sources, particularly by distillation of crude petroleum or by distillation of various petroleum refinery streams. A particularly suitable paraffinic solvent for the purposes of the present invention is conventional kerosene of petroleum origin.

The predominantly naphthenic hydrocarbon solvent of the present invention is likewise preferably derived from petroleum sources, such as crude petroleum or petroleum refinery streams. A material particularly suited for use in accordance with the present invention is conventional petroleum naphtha.

As previously pointed out, the highly aromatic pitches, referred to above, have been found to be substantially insoluble in these paraffinic and naphthenic solvents either alone or in combination. However, it has been found, in accordance with the present invention, that such naphthenic and paraffinic solvents can be utilized to reduce the viscosity or cutback highly aromatic pitches by utilizing therewith a coupling agent for the solvent system. This coupling agent has been found to be highly effective and to produce completely compatible and homogeneous compositions which have excellent storage life. The coupling agent, in accordance with the present invention, is methylene chloride.

Accordingly, a highly effective composition in accordance with the present invention includes a predominantly aromatic bituminous material, in an amount between about 35 percent and 75 percent by volume, a predominantly paraffinic solvent, in an amount between about 15 percent and 35 percent by volume, a predominantly naphthenic solvent, in an amount between about 5 percent and 20 percent by volume, and methylene chloride in an amount between about 5 percent and 20 percent by volume.

By way of specific example, the bituminous composition of the present invention was prepared from a thermally cracked petroleum pitch by the following procedure. The thermally cracked pitch was heated to about 325° F. and pumped into a blending tank equipped with cooling coils and an impeller-type mixer. Immediately thereafter, kerosene was slowly added to the pitch. The mixture was continuously agitated and cooled. When the temperature of the kerosene-pitch mixture reached about 250° F., approximately 25° F. below the boiling point of heavy naphtha, the heavy naphtha was added to the mixture. Agitation and cooling was continued until the kerosene-naphtha-pitch mixture reached 100 to 105° F. (a viscosity at 77° F. SFS of the mixture at this point is approximately 500). Methylene chloride was then added very slowly and agitation was continued for a period of about 30 minutes. The viscosity of the finished material dropped to 50 SFS at 77° F. Samples of the material produced in accordance with this example have been stored for periods in excess of one year without any change in the homogeneity of the blend. By comparison, samples containing all of the above ingredients except the methylene chloride separated in a few hours. The composition was also found to be capable of spraying at ambient temperatures ranging between about 32° and 100° F. without any preheating. The composition was also found to penetrate quite rapidly into clay, sand or silt and to cure very quickly. Tests of the material as a soil stabilizer also showed that the cured stabilizer-soil mix, when subjected to low temperatures, has "self-healing" characteristics when thereafter exposed to higher temperatures, pressure or compaction.

A Dubbs thermally cracked pitch, having a softening point of 140° F., was utilized to prepare sprayable compositions, in accordance with the present invention.

The following table I lists the characteristics and properties of the components of four compositions prepared in accordance with the present invention. Compositions 1 through 3 contained 55 percent thermally cracked pitch, 5 percent methylene chloride, 15 percent heavy naphtha, and 25 per-

TABLE I.—ANALYSIS OF COMPONENTS

|  | 1 | 2 | 3 | 4 | Average |
|---|---|---|---|---|---|
| Thermally cracked pitch: |  |  |  |  |  |
| Specific gravity, 77/77 | 1.185 | 1.185 | 1.188 | 1.186 | 1.186 |
| Penetration 77/100/5 | 4 | 5 | 1 | 3 | 3.2 |
| S.P. | 140 | 138 | 147 | 138 | 141 |
| Methylene chloride, CH$_2$Cl$_2$: |  |  |  |  |  |
| Specific gravity | 1.335 | 1.335 | 1.335 | 1.335 | 1.335 |
| B.P., ° F. | 104 | 104 | 104 | 104 | 104 |
| Heavy naphtha: |  |  |  |  |  |
| Gravity, API | 50.6 | 49.0 | 49.0 | 50.6 | 49.8 |
| Distillation, ° F.: |  |  |  |  |  |
| IBP | 276 | 284 | 290 | 292 | 286 |
| 10% | 300 | 317 | 308 | 307 | 308 |
| 50% | 327 | 344 | 328 | 333 | 333 |
| 90% | 354 | 363 | 358 | 364 | 360 |
| EP | 392 | 384 | 398 | 394 | 392 |
| Kerosene: |  |  |  |  |  |
| Gravity, API | 43.6 | 45.4 | 40.5 | 45.1 | 43.7 |
| Distillation, ° F.: |  |  |  |  |  |
| IBP | 350 | 328 | 372 | 346 | 349 |
| 10% | 374 | 348 | 396 | 362 | 370 |
| 50% | 418 | 385 | 432 | 402 | 409 |
| 90% | 464 | 450 | 474 | 460 | 462 |
| EP | 494 | 484 | 498 | 492 | 492 | cent kerosene, respectively. Composition 4 contained a larger volume of methylene chloride and comprised 54.5 percent pitch, 5.55 percent methylene chloride, 14.9 percent heavy naphtha, and 24.85 percent kerosene.

The following table II gives a list of proposed specifications for a bituminous, penetrative soil binder, the ASTM Test Method for determining the specification value, the results of these tests performed on the best known commercial composition for this purpose and the results of these tests performed on the four previously mentioned compositions, prepared in accordance with the present invention.

TABLE II

| Specification designation | ASTM test method | Min. | Max. | Commercial | 1 | 2 | 3 | 4 |
|---|---|---|---|---|---|---|---|---|
| (1) Flash point T.O.C. | D-1310 | 80 |  | 155 | 112° F. | 120 | 181 | 146 |
| (2) Saybolt furol viscosity, at 122° F., SFS | D-88 | 50 | 80 | 79.7 | 19.5 | 17 | 15.1 | 14.6 |
| (3) Kinematic viscosity, at 140° F., cs. | D-2170 | 65 | 100 | 103.9 | 17.2 | 18.3 | 15.3 | 11.6 |
| Distillation to 680° F. | D-402 |  |  |  |  |  |  |  |
| (4) Residue, volume percent by difference |  | 48 |  | 60 | 60 | 60 | 61 | 59 |
| (5) Residue penetration at 77° F., 100 g., 5 sec. | D-5 |  | 18 | 13 | 19.5 | 9 | 17 | 17 |
| (6) Residue ductility at 77° F., 5 cm./min. | D-113 | 3 |  | 0 | 0 | 0 | 3 | 0 |
| (7) Residue softening point (ring and ball) | D-36 |  | Note 1 | 147 | 132 | 133 | 128 | 130 |
| (8) Residue thin-film oven test penetration at 77° F., 100 g., 5 sec. |  |  |  |  |  |  |  |  |
| Distillation to 500° F. (See Note 2) | D-1754 | 3 |  | 0 | 5 | 0 | 1 | 0 |
| (9) Residue Saybolt furol viscosity at 210° F., SFS | D-402 |  |  |  |  |  |  |  |
| Distillation to 600° F. (See Note 3) | D-88 | 95 | 140 | 153 | 44 | 80 | 25.7 | 33.9 |
| (10) Residue penetration at 77° F., 100 g., 5 sec. | D-5 | 50 | 95 | 36 | 70 | 62 | 70 | 80 |

NOTE 1. Maximum Softening Point shall be as follows:

| When Residue Penetration (No. 5 above is) | Maximum Softening Point (R and B shall be) |
|---|---|
| 7 | 180° F. |
| 7–12 | 165° F. |
| 12–18 | 155° F. |

NOTE 2. Specification Designation No. 9 requires a sample prepared in accordance with ASTM D-402, distillation of the sample to 500° F. (altitude corrected), at which temperature the contents of the flask are immediately transferred to metal container of suitable volume, the container to be immediately closed, allowed to cool to less than 210° F., reheated to 210° F., and the Saybolt Furol Viscosity determined at that temperature in accordance with ASTM D-88.

NOTE 3. Sample prepared in accordance with ASTM D-402, distillation of the sample to 600° F., (altitude corrected) at which temperature the contents of the flask are immediately transferred to a metal container of suitable volume, the container to be immediately closed, allowed to cool to 210° F., reheated until fluid, stirred and the penetration test run in accordance with ASTM D-5.

The compositions of the present invention have been found to be superior to some 35 other formulations made in the laboratory.

TABLE III

| Specimen | Description of surface after 4 hour cure | Air blasts | | | Rainfall erosion Test | Air blasts | | | 16-20 hour cure plus 1 hour at 120° F. surface temp. | Air blasts | | | Penetration into specimen |
|---|---|---|---|---|---|---|---|---|---|---|---|---|---|
| | | 50 m.p.h. | 100 m.p.h. | 150 m.p.h. | | 50 m.p.h. | 100 m.p.h. | 150 m.p.h. | | 50 m.p.h. | 100 m.p.h. | 150 m.p.h. | |
| Sand in a loose, dry state | Even cure, surface smooth, tough, cured in less than 1 hour. | Survived. | Survived. | Survived. | Survived. | Survived. | Survived. | Survived. | Surface unchanged | Survived. | Survived. | Survived. | 1/32 inch. |
| Silt in a loose dry state | Even cure, surface smooth, one crack due to air displacement in sample. | do | Surface broke after 10 seconds. | Survived. | | | | | | | | | No measurement. |
| Silt compacted and dried back | 80% cured, 20% tacky | do | Survived. do | Survived. do | do | Survived. do | Survived. do | Survived. do | 90% cured, 10% tacky | Survived. | Survived. | Survived. | 1/32 inch. |
| Heavy clay in a loose, dry state | Even cure, surface "alligatored." | do | Survived. do | Survived. do | do | Survived. do | Survived. do | Survived. do | Surface partially "healed," clay could be seen through fissures. | Survived. | Surface broke after 10 sec. | Survived. | Do. |
| Heavy clay compacted and dried back | Surface tacky | do | do | do | do | do | do | do | Surface tacky | Survived. | Survived. | Survived. | 1/32 inch, surface tacky. |

The material, listed as formulation 1 previously, was also subjected to a series of rigorous laboratory durability tests designed to evaluate the same as dust palliatives in accordance with the procedure outlined below.

Five specimens were prepared in lucite molds, 6 inches square and 3 inches deep, using the following soil types and conditions:

1. Sand in a loose, dry state with a water content of less than 1 percent;

2. Silt in a loose, dry state processed to pass a No. 40 sieve, with a water content of 3 percent or less, the surface being prewetted by fogging with water to break existing surface tension;

3. Silt processed to pass a No. 4 sieve and brought to a water content of 18 percent, compacted to a dry density of 90 lbs. per cubic foot and dried back at a surface temperature of 120° F. for 1 hour;

4. Heavy clay in a loose, dry state processed to pass a No. 40 sieve and having a water content of 9 percent or less. The surface was prewetted by fogging with water to break existing surface tension;

5. Heavy clay processed to pass a No. 4 sieve and brought to a water content of 28 percent, compacted to a dry density of 90 lbs. per cubic foot and dried back at a surface temperature of about 120° F. for 1 hour.

Each of the above specimens was treated with composition No. 1 at a rate of 3 lbs. per square yard and allowed to dry 4 hours at 75° F. and 50 percent humidity.

After the 4-hour cure, each sample was subjected to successive air blasts generating stagnation pressures of 7, 30, and 55 pounds per square foot (simulating winds of 50 miles per hour, 100 miles per hour, and 150 miles per hour). Each air blast was sustained for 1 minute and directed to impinge on the treated surface at an angle of 20°.

All specimens surviving the air blasts were then subjected to simulated rainfall for a period of 1 hour and the air impingement tests were repeated.

All surviving samples were then cured at ambient laboratory conditions for an additional 16 to 20 hours and placed under infrared lamps where a surface temperature of 120° F. was maintained for 1 hour. The specimens were then resubjected to the air impingement tests.

Table III briefly describes the results obtained in this series of tests.

It is to be noted that all of the samples survived the 50 mile-per-hour air blast after the initial 4-hour cure. By comparison, very few samples of similar materials met this first test. The silt in the loose, dry state began disintegrating after being subjected to the 100 mile-per-hour air blast for 10 seconds. The heavy clay began disintegration after being subjected to the 100 mile-per-hour air blast for 10 seconds, after having survived the 4-hour cure, the air blasts, rainfall erosion followed by air blasts, the 16 to 20-hour cure and surface heating. The loose sand, compacted silt and compacted clay withstood all tests.

Having described and illustrated the present invention by way of specific examples, it is to be understood that such specific examples are by way of illustration only and that the present invention is to be limited only in accordance with the appended Claims.

We Claim:

1. A method for preparing a normally fluid, bituminous composition, comprising, heating a highly aromatic bituminous material to a temperature above its melting point, cooling the melted highly aromatic bituminous material while agitating and simultaneously adding kerosene continuing the cooling and agitation while simultaneously adding petroleum naphtha and continuing the cooling and agitation to ambient temperature while simultaneously adding methylene chloride.

2. A method in accordance with claim 1 wherein the aromatic bituminous material is a pyrogenous residue.

3. A method in accordance with claim 1 wherein the aromatic bituminous material is a thermally cracked pitch.

4. A method in accordance with claim 3 wherein the pitch is of petroleum origin.